(12) United States Patent
Venkatasubramanian et al.

(10) Patent No.: US 10,951,604 B1
(45) Date of Patent: Mar. 16, 2021

(54) SECURE SERVICE DEPLOYMENT AND ACCESS LAYER SPANNING MULTI-CLUSTER ENVIRONMENTS

(71) Applicant: Hortonworks Inc., Santa Clara, CA (US)

(72) Inventors: Srikanth Venkatasubramanian, Sunnyvale, CA (US); Hemanth Yamijala, Bangalore (IN); Abhishek Kumar, Bangalore (IN); Ashwin Rajeev, Bangalore (IN); Lawrence J McCay, III, Cherry Hill, NJ (US)

(73) Assignee: Cloudera, Inc., Palo Alto, CA (US)

( * ) Notice: Subject to any disclaimer, the term of this patent is extended or adjusted under 35 U.S.C. 154(b) by 95 days.

(21) Appl. No.: 16/140,411

(22) Filed: Sep. 24, 2018

Related U.S. Application Data

(60) Provisional application No. 62/562,635, filed on Sep. 25, 2017.

(51) Int. Cl.
| | | |
|---|---|---|
| *H04L 29/06* | (2006.01) | |
| *G06F 21/62* | (2013.01) | |
| *G06F 9/38* | (2018.01) | |
| *H04L 12/751* | (2013.01) | |
| *G06F 16/182* | (2019.01) | |

(52) U.S. Cl.
CPC ........ *H04L 63/0815* (2013.01); *G06F 9/3891* (2013.01); *G06F 16/182* (2019.01); *G06F 21/6218* (2013.01); *H04L 45/02* (2013.01); *H04L 63/0807* (2013.01); *H04L 63/20* (2013.01)

(58) Field of Classification Search
CPC . H04L 63/0815; H04L 63/0807; H04L 45/02; H04L 63/20; G06F 21/6218
USPC .......................................................... 726/29
See application file for complete search history.

(56) References Cited

U.S. PATENT DOCUMENTS

| | | |
|---|---|---|
| 9,774,586 B1 | 9/2017 | Roche et al. |
| 2009/0070764 A1 | 3/2009 | Guizar et al. |
| 2017/0201455 A1 | 7/2017 | Amulothu et al. |
| 2018/0063143 A1* | 3/2018 | Wilson .................... H04L 67/32 |
| 2018/0324172 A1* | 11/2018 | Unnikrishnan ....... H04L 9/3213 |
| 2019/0089809 A1 | 3/2019 | Theebaprakasam et al. |
| 2020/0076817 A1* | 3/2020 | Gupta ..................... G06F 21/41 |

* cited by examiner

*Primary Examiner* — Evans Desrosiers
(74) *Attorney, Agent, or Firm* — Staniford Tomita LLP

(57) ABSTRACT

Embodiments for deploying services to multiple Hadoop clusters and providing user access to these services in a secure manner. A process allows authorized users to select a service, validate its entitlement to the organization and then install distributed components of the service onto multiple hosts on different Hadoop clusters. In order to enable this deployment and secure access of this service, an identity federation mechanism is used to ensure the user identity of the system is propagated to distributed clusters in a secure fashion thereby ensuring authorized access to clusters or services is provided in a seamless fashion.

18 Claims, 10 Drawing Sheets

SECURE SERVICE DEPLOYMENT AND ACCESS LAYER SPANNING MULTI-CLUSTER ENVIRONMENTS

CROSS-REFERENCE TO RELATED APPLICATIONS

The present application claims priority to U.S. Provisional Application No. 62/562,635, filed on Sep. 25, 2017 and entitled "Secure Service Deployment, Extensible Management, and Management of Data Assets in Hadoop Multi-Cluster Environments," and is related to U.S. patent application Ser. No. 16/140,434, filed on Sep. 24, 2018, and entitled "Extensible Framework for Managing Multiple Hadoop Clusters."

TECHNICAL FIELD

Embodiments are generally directed to multi-cluster network environments, and more specifically to providing a centralized and secure service deployment spanning multiple Hadoop clusters.

BACKGROUND

The Hadoop Distributed File System (HDFS) is a software framework for distributed storage and processing of big data on clusters of machines. The HDFS splits large files into large blocks, such as of size 64 MB or 128 MB, and distributes the blocks among nodes in a cluster. An associated programming model, such as MapReduce can be used to perform data processing, such as filtering and sorting the large data sets in parallel on a cluster. HDFS is structured similarly to a regular Unix filesystem except that data storage is distributed across several machines. It provides a filesystem-like layer for large distributed systems to use. It has in built built-in mechanisms to handle machine outages, and is optimized for throughput rather than latency. There are three main types of machines in a HDFS cluster: a datanode where HDFS actually stores the data (a cluster has multiple datanodes), a namenode or master machine that controls all the meta data for the cluster, and a secondary namenode that is a separate service that keeps a copy of both the edit logs, and filesystem image, merging them periodically to keep the size reasonable. Data in HDFS can be accessed using either the Java. API, or the Hadoop command line client. Many operations are similar to their Unix counterparts.

Current Hadoop solutions have a cluster-centric view towards management and security. However, as the adoption of Hadoop grows in organizations, it is common to have many clusters handle geographical distribution, economy, agility and so on. These clusters could be deployed in private or public clouds or in on-premise data centers with physical hosts. The services on these clusters could be managed and accessed by different sets of users with independent cluster level authorization rules. There are several use cases that demand a centralized access to the data and compute facilities of these clusters, given the availability of suitable data and computational capacity. Given the variety of such user personas and their needs, it is imperative to allow for different applications to provide this centralized access, i.e., each suitable for solving a given set of use cases. At the same time, it is important to provide ease for developers of such applications to target their end users, without concern about common issues like authentication, authorization, secure cluster access and operational management.

The current cluster-centric view toward security means that services on these clusters could be managed and accessed by different sets of users with independent cluster level authorization rules. This provides certain complexities with respect to management and control. It would be advantageous, therefore, to provide a centralized deployment and access solutions to distributed service in a way that preserves a single pane of glass user experience that a single cluster solution provides.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
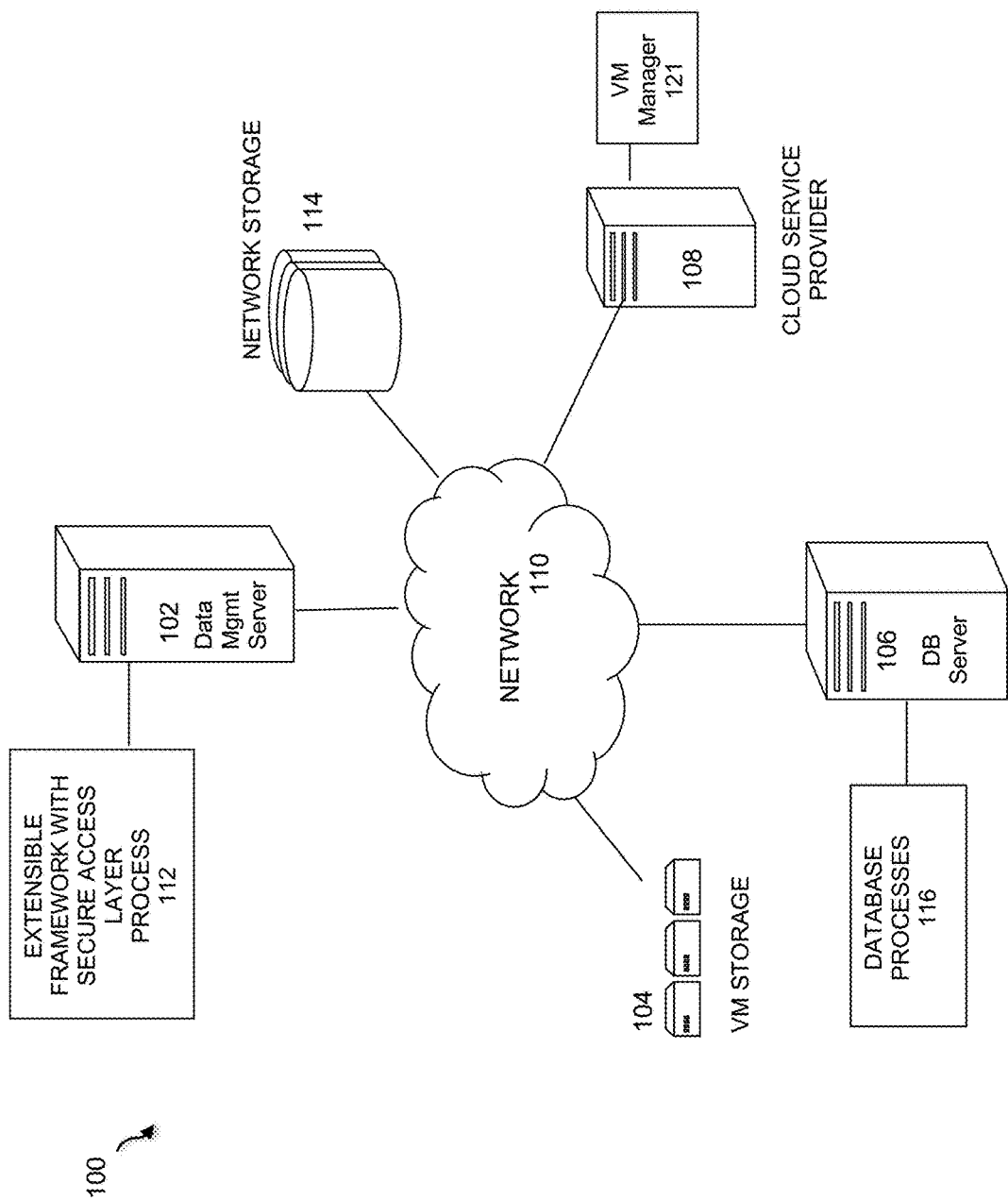
FIG. 1 illustrates a large-scale data processing and storage network implementing an extensible framework for managing multiple Hadoop clusters, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

FIG. 1 is a diagram of a large-scale data processing system including cloud and WAN/LAN networks implementing an extensible framework for managing multiple Hadoop clusters, under some embodiments. In system 100, a data management server 102 executes a data management process 112 that coordinates or manages the generation, storage, management, and security access of data and associated metadata and content for various data sources 106 and 108 and storage devices, such as network storage 114, client storage 106, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs 104 and 106, and to the data source 108 through network 110, which is typically a cloud network, but may also be a LAN (local area network), WAN (wide area network), or other appropriate network. It may also be a composite network comprising private/public cloud and other local/wide area networks. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. Various different applications, such as backup processes, data applications, and so on generate and store this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 118) for the database(s) in a variety of formats.

As stated above, cloud network 110 may be a private network or it may be a public network provided by a third-party cloud service provider (CSP). In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider.

System 100 may represent a large-scale or enterprise-scale system in which an organization executes various different data-driven technologies. A typical modern data architecture captures and processes huge amounts of data in real-time. Such data may be classified as "big data" and more commonly "data lakes." Embodiments of the data management process help facilitate the capture, storage and processing of large and growing amounts of data generated and ingested in the system. In general, the term "big data" refers to data sets that are so large (e.g., terabyte scale datasets) or complex that traditional data processing and interchange applications are inadequate. Special programs are needed for various data processing tasks, such as data capture, analysis, storage, transfer, virtualization, querying, security, and so on.

The data stored and processed by system 100 may comprise any relevant data of concern to companies, organizations, enterprises and so on, and may comprise highly sensitive or confidential information, such as financial information, medical information, personal identification information, trade secrets, confidential business or government information, and so on. Such data may comprise data assets that directly generate revenue or represent valuable or sensitive information. Such data may also be monitored, regulated, stored or otherwise processed by other entities and under certain rules and statutes, such as HIPAA (Health Insurance Portability and Accountability Act), GDPR (General Data Protection Regulation), privacy acts (e.g., California Consumer Privacy Act), and so on.

Figure 2:
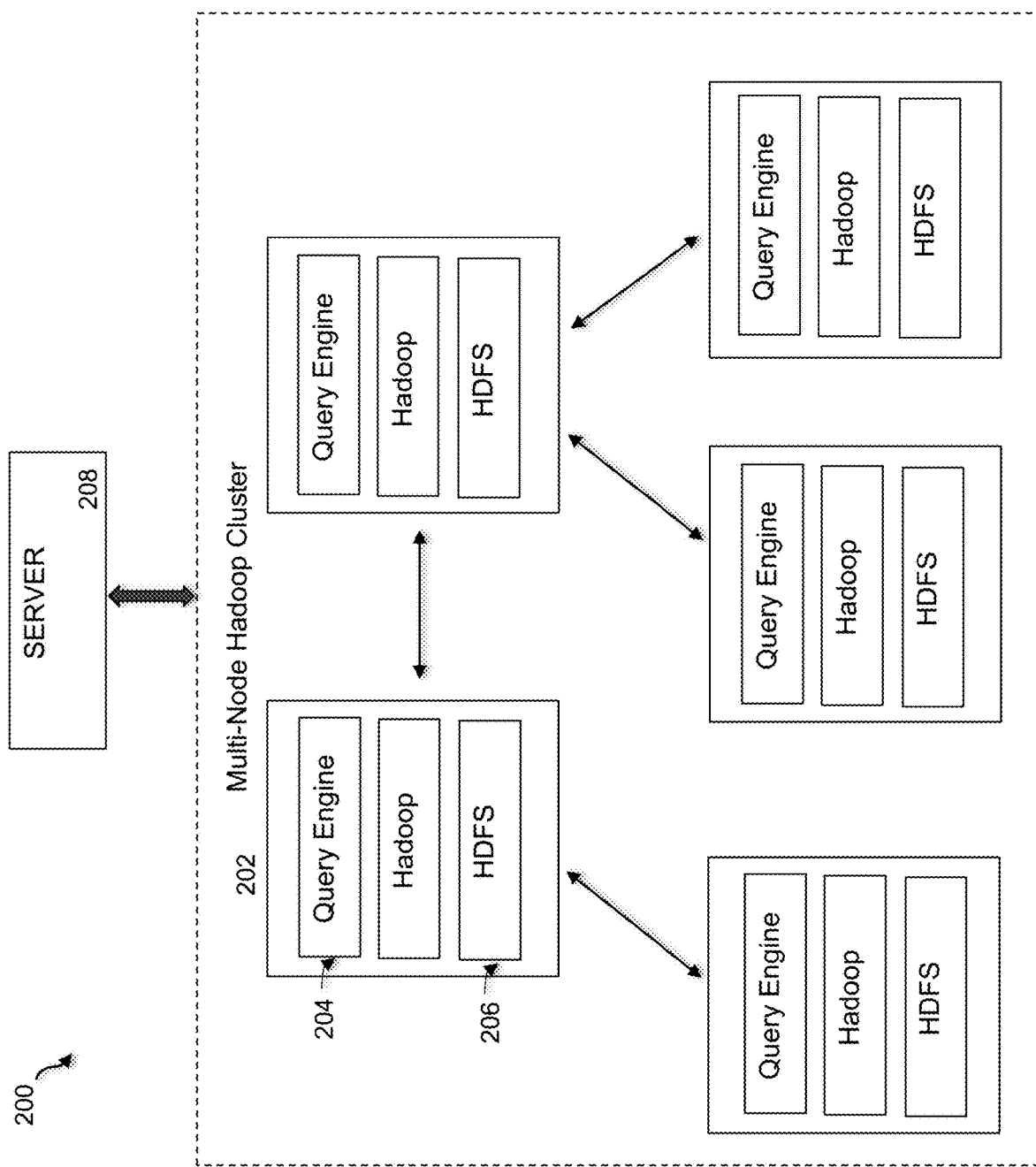
FIG. 2 illustrates a Hadoop multi-cluster environment with devices that implement one or more embodiments described herein.

In an embodiment, system 100 processes data using the Hadoop collection of software utilities and stored using the Hadoop Distributed File System (HDFS), which is a distributed file system that stores data on commodity machines, providing very high aggregate bandwidth across the cluster. Generally, Hadoop splits tiles into large blocks and distributes them across nodes in a cluster. It then transfers packaged code into nodes to process the data in parallel. It uses data locality where nodes manipulate the data they have access to, to allow the dataset to be processed very quickly and efficiently. Diagram 200 of FIG. 2 illustrates a Hadoop multi-node cluster environment coupled to a server 208, and that supports certain embodiments described herein. Hadoop runs across multiple nodes, with the nodes typically implemented as either small, low-cost servers or servers running in the network, such as the cloud. The underlying operating system running on the servers is typically Linux. As shown in FIG. 2, each cluster 302 runs a query engine 204 and the HDFS 206.

In general, HDFS has a master/slave architecture. An HDFS cluster consists of a single namenode, a master server that manages the file system namespace and regulates access to files by clients. In addition, there are a number of datanodes, usually one per node in the cluster, which manage storage attached to the nodes that they run on. HDFS exposes a file system namespace and allows user data to be stored in files. Internally, a file is split into one or more blocks and these blocks are stored in a set of datanodes. The namenode executes file system namespace operations like opening, closing, and renaming files and directories. It also determines the mapping of blocks to datanodes. The datanodes are responsible for serving read and write requests from the file system's clients. The datanodes also perform block creation, deletion, and replication upon instruction from the namenode.

HDFS supports a traditional hierarchical file organization. A user or an application can create directories and store files inside these directories. The file system namespace hierarchy is similar to most other existing file systems; one can create and remove files, move a file from one directory to another, or rename a file. HDFS does not yet implement user quotas. HDFS does not support hard links or soft links. However, the HDFS architecture does not preclude implementing these features. The namenode maintains the file system namespace. Any change to the file system namespace or its properties is recorded by the namenode. An application can specify the number of replicas of a file that should be maintained by HDFS. The number of copies of a file is called the replication factor of that file. This information is stored by the namenode.

Figure 3:
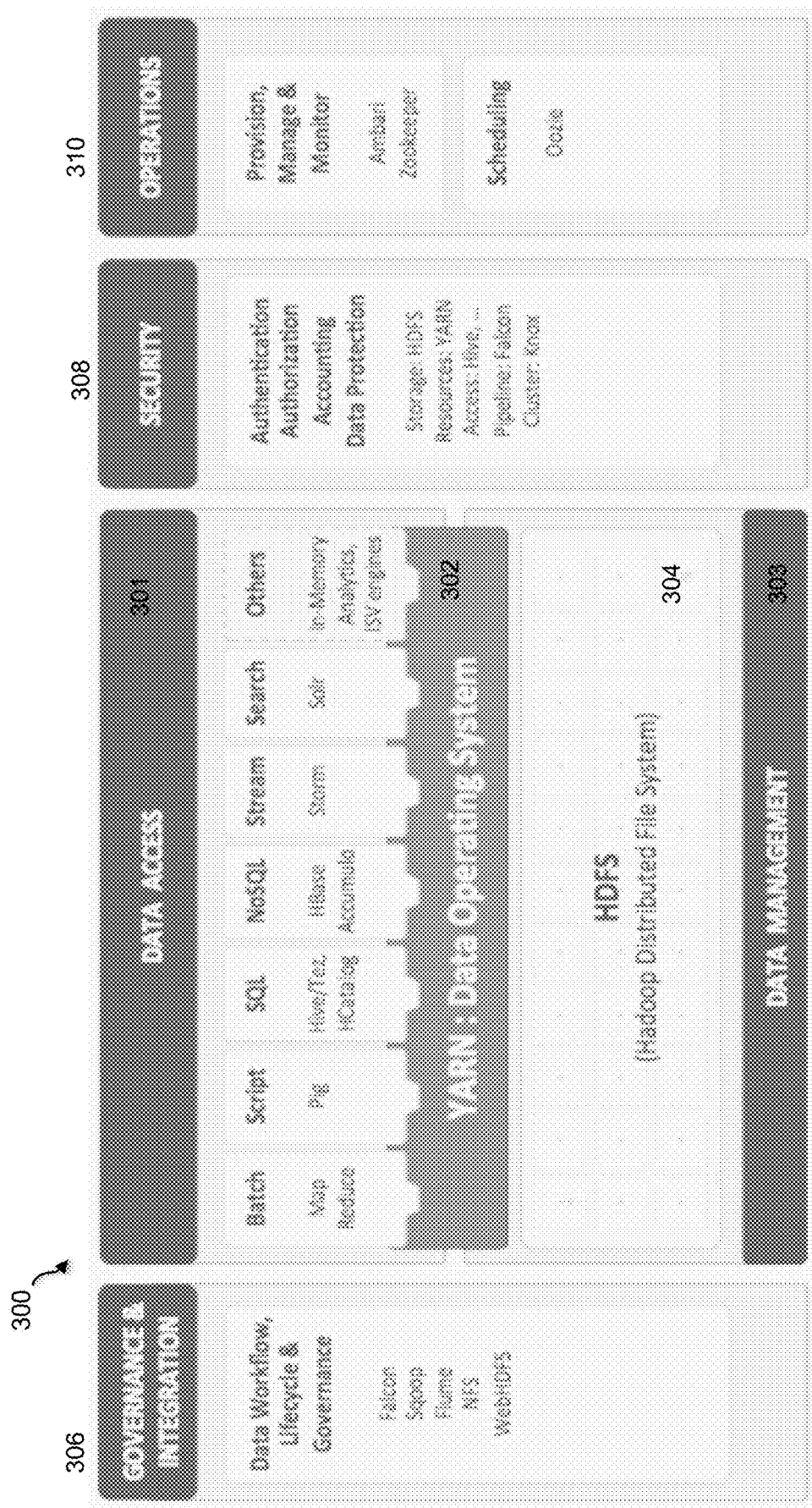
FIG. 3 illustrates a data platform in a multi-cluster environment that supports certain embodiments described herein.

FIG. 3 illustrates a data platform in a multi-cluster environment that supports certain embodiments described herein. The Apache Hadoop YARN (Yet Another Resource Negotiator) layer 302 is a cluster management technology that is characterized as a large-scale, distributed operating system. YARN combines a central resource manager that reconciles the way applications use Hadoop system resources with node manager agents that monitor the processing operations of individual cluster nodes. The HDFS layer 304 is designed to reliably store very large files across machines in a large cluster. It stores each file as a sequence of blocks; all blocks in a file except the last block are the same size. The blocks of a file are replicated for fault tolerance. The block size and replication factor are configurable per file. An application can specify the number of replicas of a file. The replication factor can be specified at file creation time and can be changed later. Files in HDFS are write-once and have strictly one writer at any time. The namenode makes all decisions regarding replication of blocks. In system 300, certain other main functional components, such as data governance and integration 306, security 308, and operations 310 may also be implemented and supported in conjunction with the main data access 301 and data management 303 components.

Extensible Management Process for Managing Multiple Hadoop Clusters

As shown in FIG. 1, embodiments include a process or processing component 112 for secure service deployment and access layer spanning multiple Hadoop clusters. Such embodiments include a system that provides a framework where application developers can write and deploy distributed (or non-distributed) applications that need to access services from multiple Hadoop clusters in a seamless manner. The framework includes a shell that allows developers to plugin user interfaces that abstract common facilities like authentication, authorization and cluster access, and operational tools for deploying and managing service life cycles independently of each other.

Cluster services typically include programs or products that provide features such as: user authentication, data security, data validation, data processing, and so on. Cluster services include Apache Ranger for data security, Apache Atlas for metadata management and governance, Apache Hive for data processing and Apache Ambari for cluster management and configuration. Although specific Apache products are mentioned, embodiments are not so limited and any similar products or programs may be used to provide security, metadata management, data processing, cluster management, and any other relevant cluster services.

Process 112 provides a web-based user interface (UI) framework that allows end users to authenticate and access different applications in a seamless manner. Authentication is provided by integrating with proprietary or third-party authentication services, such as the Apache Knox authentication service. Apache Knox, and similar services, can be configured with various identity providers like an LDAP (lightweight directory access protocol) based source. The access to different services is provided by RESTful APIs. The Apache Knox gateway is a system that provides a single point of authentication and access for Apache Hadoop services in a cluster. It simplifies Hadoop security for users that access the cluster data and execute jobs and operators that control access and manage the cluster. The gateway runs as a server, or a cluster of servers, providing centralized access to one or more Hadoop clusters. Policy enforcement ranges from authentication/federation, authorization, audit, dispatch, host mapping and content rewrite rules. Policy is enforced through a chain of providers that are defined within the topology deployment descriptor for each Apache Hadoop cluster gated by Knox. The cluster definition is also defined within the topology deployment descriptor and provides the Knox Gateway with the layout of the cluster for purposes of routing and translation between user facing URLs and cluster internals. Each Apache Hadoop cluster that is protected by Knox has its set of REST APIs represented by a single cluster specific application context path. This allows the Knox Gateway to both protect multiple clusters and present the REST API consumer with a single endpoint for access to all of the services required, across the multiple clusters. Although embodiments are described with respect to Apache Knox authentication, embodiments are not so limited, and any other similar authentication service can be used.

In general, REST (Representational State Transfer) is an architectural style that defines a set of constraints to be used for creating web services. Web Services that conform to the REST architectural style, or RESTful web services, provide interoperability between computer resources in a network, such as system 100 of FIG. 1.

Process 112 also allows an administrator to provision applications and provide appropriate access to them to different end users. Some typical applications commonly in use are a data replication application, and a data discovery and governance application. However, the platform itself is agnostic to the specific applications that can integrate with it, thus virtually any application can be used and supported. Provisioning of these applications occurs by virtue of an application manifest that defines metadata properties like its name, a description, an icon to represent it in the UI, a web URI (uniform resource identifier) that can be used to access this application, a set of roles required to be assigned to users to access this application, and so on. The web URI is dynamically added to the routing layer of the software so that this can be used to route requests to the application. The web-based graphical user interface (GUI) can be designed and configured such that navigational aspects of the UI framework define an infrastructure through which different applications can be accessed, providing a consistent look and feel. In addition to the user experience, the framework provides application developers with a rich set of APIs for extracting information about clusters they would like to connect to, and data assets they would like to discover and use.

In an embodiment, the APIs are exposed via REST, and are implemented using a web service layer that is part of the software. The different resources exposed via the API include clusters, cluster services, cluster hosts, users, groups, application services, security settings like LDAP configuration, etc. Standard CRUD (create, read, update and delete) operations on all of these resources are exposed. Developers can invoke these APIs using standard REST clients of their choice. The software also provides libraries that wrap these REST client APIs for convenience. In addition, all of this access is governed through a consistent security mechanism that authenticates against a centralized identity store and applies role based access constraints. The centralized identity store is typically an LDAP store like a Microsoft Active Directory (or similar) service that is part of a corporate that deploys this software. Service access to cluster specific services is wrapped through a protocol that ensures the identity of the user is propagated to the cluster services securely.

Services in the process 112 include a deployment of the Apache Knox (or similar) service as a micro-service that is configured to authenticate users against an identity provider. The configuration includes information about how to reach the identity provider, and other provider specific information. For example, for LDAP, this can be the LDAP URL, admin user and password, search bases in the LDAP tree for looking up users or groups, the names of the object classes for users and groups, and so on. When a user authenticates himself or herself to the identity provider using Knox, a cookie is setup to encapsulate information about the user. This cookie is encrypted with a private key. Any system configured with the public key of this pair can validate the cookie.

In order to provide authenticated access to any HDP cluster service, a similar service (e.g., Apache Knox) must be installed on the cluster and configured to provide single sign-on facilities to the cluster services. The identity propagation mechanism requires that Knox be configured with a specific service, called a topology in Knox terms. This topology can map a Knox authenticated cookie to a cluster specific cookie that can be used in REST API calls to sign on to SSO (secure sign on) enabled HDP services. This mapped cookie preserves the identity of the user authenticated in the system, and passes this identity to HDP cluster services. In this manner, any authorization settings for that user in the cluster services will automatically be applied to API calls made from the system services.

The above solution means that the aggregation layer must make a special call to Knox on the HDP cluster to get the mapped SSO cookie that is specific to a cluster's context, before any calls are made to the cluster services. Further, the Knox service on the cluster must be configured with the public key of the aggregation layer's microservice as described above. In order to further protect this instance, we can setup authorization rules that restrict who can make these calls, like which hosts can the request come from (by IP address), or which users can make these calls.

The process 112 software also defines mechanisms to deploy applications in a consistent fashion and connect them seamlessly to the core layers through a service discovery mechanism. The mechanisms defined by the software include a mechanism to build and package the software as images used by a containerization program. These images are exported into a distributable package and installed on the host machines. The software also defines scripts that can be used to manage the lifecycle of these applications such as starting, stopping and enabling them for access. In an embodiment, the Docker program can be used for containerization. The Docker program performs OS-level virtualization to run software packages called "containers." Containers are isolated from each other and bundle their own tools, libraries, and configuration files. They are run by a single OS kernel and communicate with each other through channels. Containers are created from images that specify their contents. Although embodiments are described with respect to the Docker program for containerization, embodiments are not so limited and other virtualization and containerization products can also be used.

Figure 4:
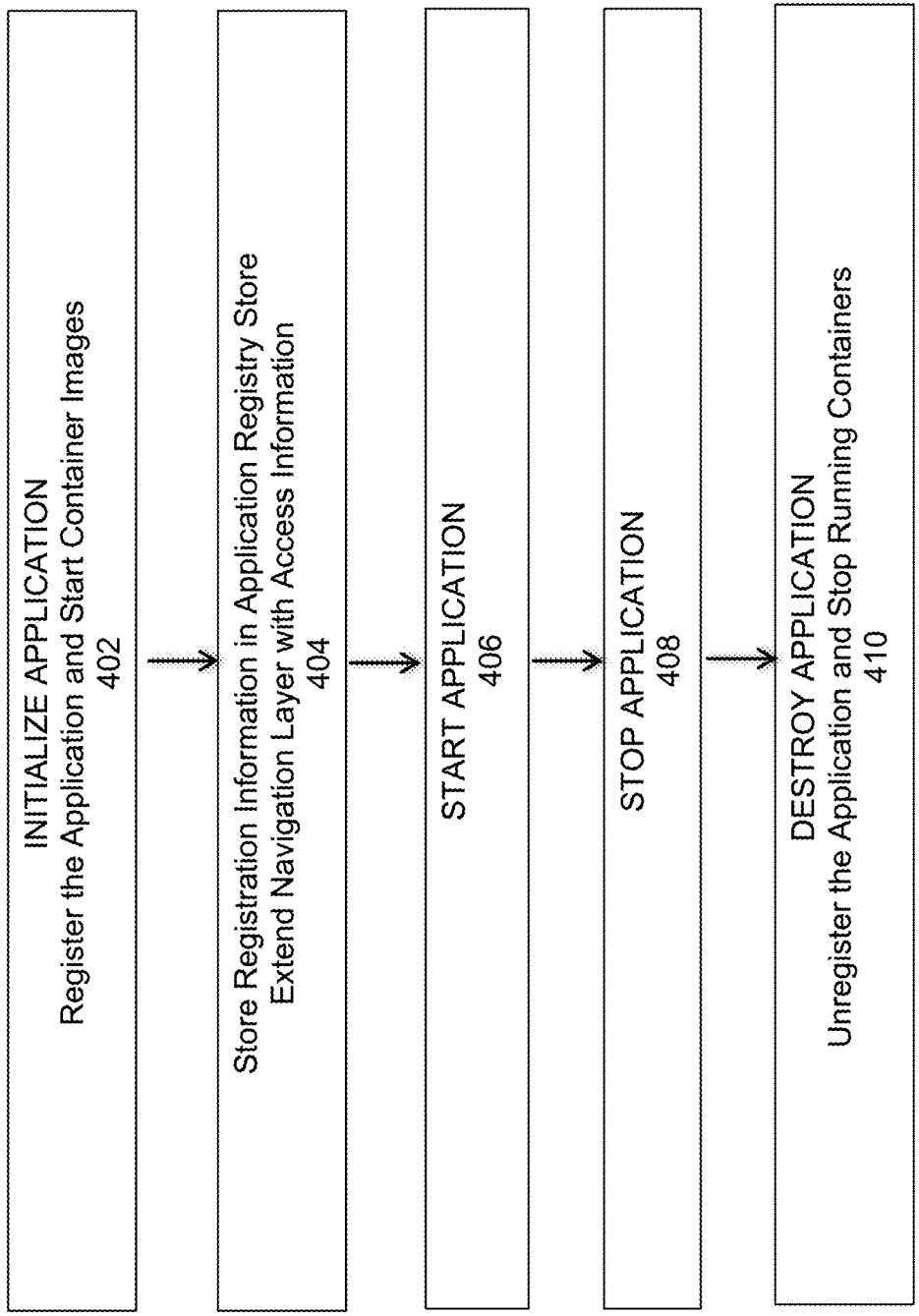
FIG. 4 is a flowchart that illustrates lifecycle operations performed on an application by the extensible management process, under some embodiments.

In an embodiment, a deployment script executed by process 112 allows certain lifecycle operations to be performed for an application. FIG. 4 is a flowchart that illustrates lifecycle operations performed on an application by the extensible management process, under some embodiments. As shown in FIG. 4, the process begins with the initialization of the application, step 402. This initialization process registers the application with the application registration sub-system and also starts the containers from the Docker images. The registration information includes metadata like the name and version of the application, and other properties like what roles it defines for user authorization, the route on how to access the application, and so on. It also includes some metadata that is relevant for accessing the application from a user interface perspective like its icons, descriptive name, and so on. One important piece of this metadata is a specification of the list of cluster services that an application requires to communicate with the cluster. This list is used as part of cluster service discovery and further used to check the compatibility of a cluster for a particular service. If a cluster is not compatible due to absence of any of the specified dependent services on the cluster, the cluster is not allowed to be used by the particular application. As shown in FIG. 4, the registration sub-system stores this information in an application registry store, step 404. It also extends the navigation layer with information about how incoming calls to access the application should be routed to the application container. This step allows the process to dynamically extend the centralized application management software in process 112 with new applications.

Registered applications can be started (step 406), or stopped (step 408). The start operation essentially allows a stopped application to be started, while the process of stopping an application also stops the running containers. Stopping an application, however, does retain any state the application holds so that it can be started again.

The process 112 also destroys the application, step 410. This is the inverse operation that unregisters the application and stops the running containers. It destroys all of the state of the application and from this point, the application cannot be accessed anymore.

When applications are enabled, they register their API endpoints, which are represented by a URI to a central service discovery module that then exposes the service endpoints to any other service which needs to access the same. As described above, the software provides a centralized routing capability that maps the URI to the service endpoints.

Figure 5:
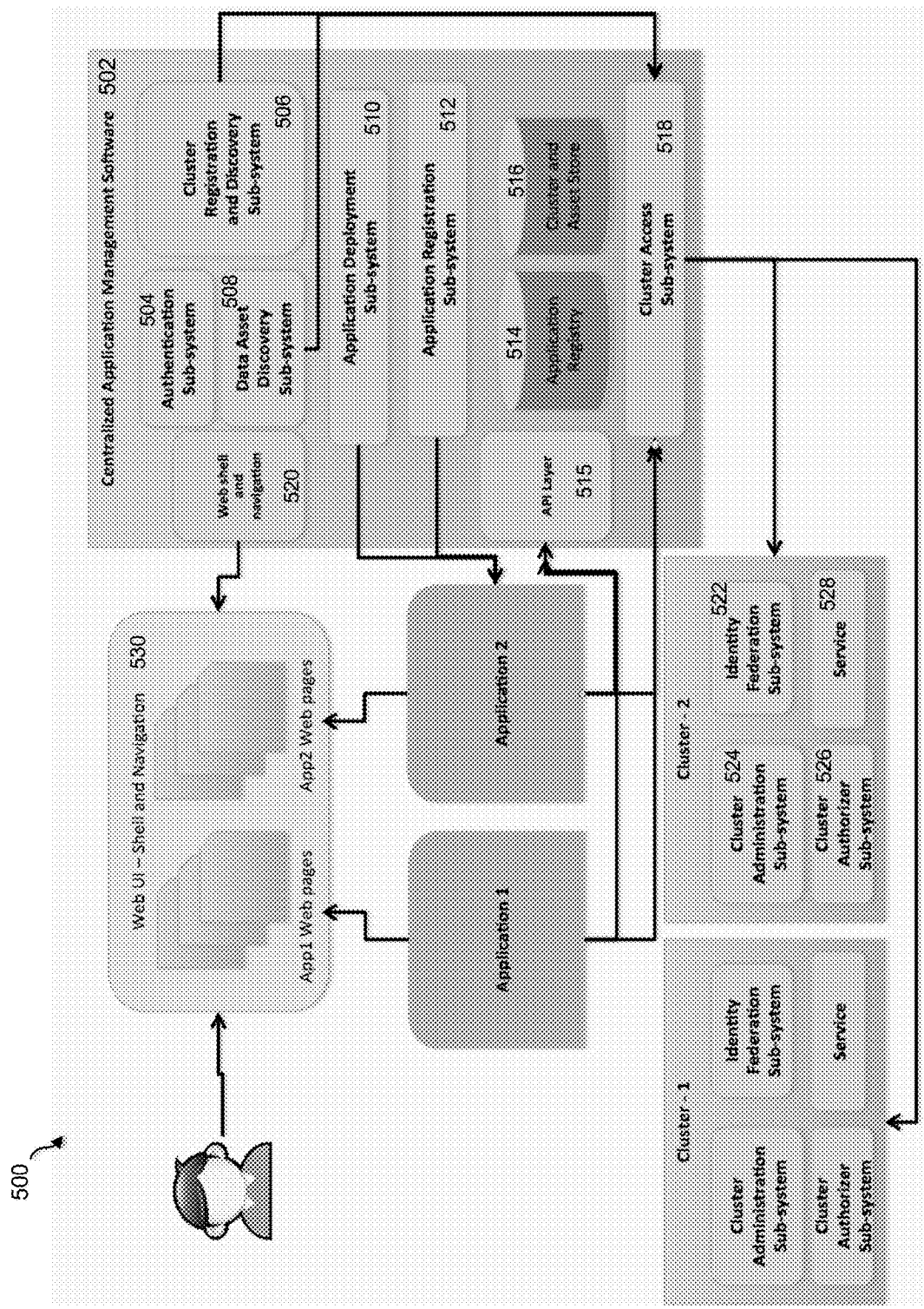
FIG. 5 is a block diagram of a centralized application management processing component for the extensible application management framework, under some embodiments.

FIG. 5 is a block diagram of a centralized application management processing component for the extensible application management framework, under some embodiments. As shown in FIG. 5, system 500 includes several sub-systems in a centralized application management software component 502, and a Web UI shell and navigation and the identity federation sub-system on the clusters. The extensible management system 500 of FIG. 5 is implemented using capabilities exposed by many of the services in FIG. 3, including but not limited to the operations component 310 and governance and integration component 306.

The centralized application management software component 502 includes an authentication sub-system 504, which comprises of the Apache Knox (or similar program) instance described above packaged as a micro-service. This system is configured as part of the setup of the centralized cluster management software with details of the identity provider like the LDAP, URL, and so on, as described above.

In an embodiment, component 502 implements aspects of the Apache Ambari Hadoop cluster management service. Apache Ambari provides software for provisioning, managing, and monitoring Hadoop clusters through a web UI backed by its RESTful APIs. Ambari enables the administrator to provision a Hadoop cluster, install Hadoop services across any number of hosts, and configure Hadoop services for the cluster. Although embodiments are described with respect to Apache Ambari, embodiments are not so limited, and other Hadoop cluster management programs and services are also possible.

In an embodiment, the cluster registration and discovery sub-system 506 takes a cluster's Ambari service URL as input and then uses the Ambari service APIs to discover details about the cluster, such as what services it is running, and on which hosts. Although an implementation may be specific to one particular form of cluster administration software (e.g., Ambari), other similar software can be supported, as system 500 is easily extensible to any other such software. Such software may be required to provide certain features. For example, it may need to allow for a mode of authenticated access, preferably single sign on type access following some standard authentication flows like OIDC (OpenID Connect) or SAML (Security Assertion Markup Language). The software should also provide HTTP APIs that can be used to find out information about the cluster such as the size of the cluster, the services running on the cluster, their components, their state, the hosts on which they run, and their configuration properties. For an example based on Ambari, certain information is exchanged for services running on an Ambari managed cluster. For each service, the following information is fetched: (1) a list of service components; (2) the hosts on which these services run; (3) the set of configuration groups for each service (e.g., core site and HDFS-site configuration for HDFS; and (4) the properties inside each configuration group as a set of key value pairs. The list of services discovered using the above APIs is matched against the requirements of the cluster services for an application as specified during its registration time in its metadata (described above), and this is used to enable a cluster for a particular application.

Within software component 502, the data asset discovery subsystem 508 is a service that is responsible for allowing users to use a query language to discover data assets in a cluster through their metadata properties. The application deployment subsystem 510 comprises a set of scripts that allow applications to install their Docker images and manage their lifecycle. The application registration subsystem 512 comprises a set of services that allow individual applications to register their service endpoints and URIs to a central service registry. The application registry 514 includes the metadata property definitions and data that the software uses to identify applications plugging into itself. The cluster and asset store 516 includes the schema and data stored in a typical RDBMS that the software uses for maintaining state of different services and assets. The cluster access subsystem 518 is a utility service that encapsulates the cluster interactions with the Apache Knox system described above in the identity propagation protocol.

The web UI shell and navigation component 530 comprises a web application to serve web pages for applications (e.g., Application 1 and Application 2) from browsers. The shell and navigation are design features that define a consistent look and feel for all applications. They also provide navigational elements like menu items for switching from one application to another, and common functions like login, user information, and so on. This component is accessed by a web shell and navigation subsystem 520 within component 502.

As shown in FIG. 5, any practical number of applications, such as Application 1 and Application 2 (up to Application n) can interface with the centralized application management software. An application is generally a plugin program that can take advantage of the various capabilities of the software and provide specific functionality to a user. Some example applications, as described above, are those that provide a data replication capability and a data governance capability.

As also shown in FIG. 5, various different clusters, such as those denoted Cluster-1 and Cluster-2 are accessed by the cluster access subsystem 518 of component 502. Each cluster has an identity federation subsystem 522, which is a component that works closely with both the authentication subsystem 504 and the cluster access subsystem 518 to propagate the identity of the logged-in user to each service on the cluster. This component provides the capability to accept a token coming from the aggregation layer services, validate it and issue a token that is valid to access cluster services. The cluster administration subsystem 524 is typically implemented as an Apache Ambari instance that provides installation, configuration management and health checks for services running on the cluster. The cluster authorizer subsystem 526 is responsible for checking if a user can access a service on the cluster, and a service 528 represents any service on the cluster that can be accessed via the centralized cluster management software 502.

Figure 6:
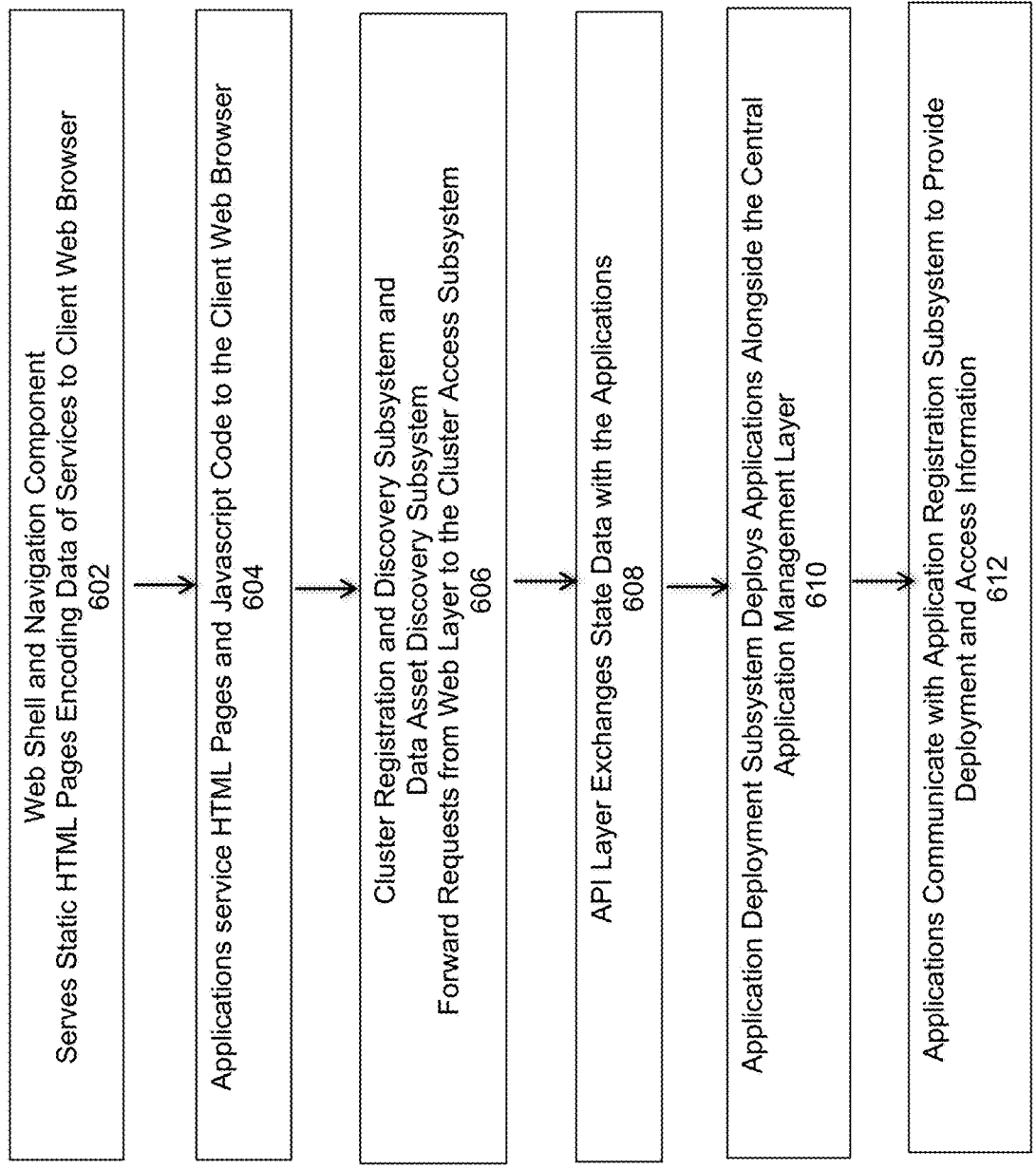
FIG. 6 is a flowchart that illustrates certain interactions between the various subsystems for the centralized application management software component of FIG. 5, under some embodiments.

FIG. 6 is a flowchart that illustrates certain interactions between the various subsystems for the centralized application management software component of FIG. 5, under some embodiments. As shown in FIG. 6, the web shell and navigation component 520 serves static HTML pages encoding data of various services to the client browser, 602. In addition, it also serves the Javascript code that executes client side logic mainly for governing user interactions on the web site. The applications (e.g., Application 1 and Application 2) that plugin to this system also service their HTML pages and Javascript to the client web browser, 604.

In step 606, the cluster registration and discovery subsystem 506, the data asset discovery sub-system 508 and the various applications forward any requests from the web layer to the cluster access sub-system 518. The cluster access sub-system plays the role of a proxy in this respect. It wraps these requests within an Apache Knox protocol interaction that preserves the identity of the logged in user, and forward these requests to the services on individual clusters. In other words, all interaction with services on the individual clusters are routed through the cluster access subsystem to ensure identity propagation happens securely between the central application management software and the individual cluster services.

In step 608, the API layer 515 exchanges different data about the state of the different applications, clusters and data assets it maintains in the application registry 514, cluster and asset store 516 with the individual applications over a HTTP-based RESTful API. This data enables the applications to provide functionality like centralized cluster management and asset management to the end user. The application deployment sub-system 510 uses commands to deploy the applications alongside the central application management layer, step 610. In an embodiment, the applications are packaged as container Docker images. The data used to do this includes an application descriptor that describes the application metadata including the name of the binary container image, the command to launch the application, configuration parameters, and so on.

In step 612, the applications communicate with the application registration subsystem exchanging data about where they are deployed and how they can be accessed, specifically their service endpoints including a network address and port or port identifier. This information is held in the application registration subsystem 512. Any other component in the central application management software component 502 or any of the applications themselves, can query the registration subsystem to discover the service endpoints of a particular service and thereby access them.

The system of FIG. 5 and the process of FIG. 6 provides a system and method for an extensible management framework for managing multiple Hadoop clusters. The illustrated system facilitates the discovery of cluster services, data assets based on various metadata systems. It provides a centralized and secure cluster access wrapper that various applications can use to access per cluster services without explicitly worrying about access mechanisms.

Centralized Secure Service Deployment and Access Layer Spanning Multi-Cluster Environments Embodiments further include a system and method for a centralized and secure service deployment and access layer spanning multi-cluster environments. As stated above, current Hadoop solutions have a cluster-centric view towards management and security. However, as the adoption of Hadoop grows in organizations, it is common to have many clusters to handle geographical distribution, economy, agility and so on. For such systems, it is important to provide a centralized deployment and access solution to these distributed services without taking away the single pane of glass user experience that a single cluster solution provides. However, while doing this, it is important to ensure that the authentication and authorization mechanisms of individual clusters is preserved even from the centralized access layer. Rebuilding a new authorization mechanism in the aggregation layer that mimics the authorization set up in each cluster is one possible solution. However, this would be laborious and also lead to conflicts in case the authorization layer has different rules from what is present on each individual cluster. Instead, an embodiment of a secure service deployment process described herein does not rebuild authorization in the aggregation layer. Rather it delegates authorization to services running on the individual clusters. In order to enable this, it is crucial that when a service is accessed from the aggregation layer onto a cluster service, it is being accessed as the user logged into the aggregation layer, i.e., the identity is federated to the cluster service. This federation must happen securely between the aggregation layer and each cluster service. Embodiments include an authentication and authorization service like Apache Knox that can be used to standardize this principle across multiple services and thus make it easy to implement it as a pattern.

Embodiments include a system that provides a capability to deploy services to multiple Hadoop clusters and access these services in a secure manner. Aspects of these embodiments may be implemented as part of process 112, as shown in FIG. 1. The solution involves a workflow that enables authorized users to select a service, validate its entitlement to the organization and then install distributed components of the service onto multiple hosts on different Hadoop clusters. In order to enable this deployment and, later secure access of this service, it implements an identity federation mechanism using security services like Apache Knox. This mechanism ensures the user identity of the system is propagated to distributed clusters in a secure fashion thereby ensuring authorized access to clusters or services is provided in a seamless fashion. As stated above, although embodiments are described with respect to Apache Knox, any other similar software product or service for providing security services may be used.

An embodiment of certain software processes provides a management console driven by web server software that can run outside a Hadoop cluster, either on a separate node in the customer's datacenter or in the cloud. This console can be attached to a centralized identity store like an LDAP directory for authentication. The console can also be attached to other providers of authentication such as password management and single sign-on services that implement standards based single sign-on flows like OpenID Connect (OIDC) or Security Assertion Markup Language (SAML).

It also provides a role based access capability through which specific users can be given access for performing centralized administration of services across multiple clusters. This administration includes policy based management for data access, replication and potentially other data services. This communication is accomplished through calling RESTful APIs that are exposed by the cluster services. These users can then register existing clusters. Registration is done by the user as part of a cluster on-boarding process. An important step in the process involves setting up a Single Sign On (SSO) configuration for the various services that the central aggregation layer needs to communicate with. One of the services is the cluster administration service that enables to discover other services, like the Ambari service. Instead of enabling single sign on for every cluster service required on the aggregation layer, it would beneficial to use a service that provides centralized SSO capabilities, like Apache Knox. Once this setup is done, i.e., the SSO is enabled on the Ambari server on the cluster using Apache Knox, the Ambari URL can then be taken as input in the management console. Part of the single sign on configuration is setting up a trust relationship between the cluster's services and another service that runs in the aggregation layer that participates in the actual authentication process. As described above, the console is attached to authentication sources. An authentication sub-system that implements this capability can be used. A trust relationship is now setup between the cluster's authentication service and the authentication service setup in the cluster.

As part of the registration process, the software discovers services and other configuration of these clusters, such as by using Ambari APIs that provide information about services running on the cluster, their components and the hosts on which they are running. The software also provides a catalog of available services that can be deployed onto multiple clusters using a workflow that checks for entitlements, and system pre-requisites on multiple clusters. After installation, the system also verifies status of these services. This process occurs on the aggregation layer web services, whenever the user registers a cluster, as described above. The workflow can be configured with a service definition that includes the following a list of services on the aggregation layer, and the backend cluster services that are dependent for each such service. Once this definition is in place, the workflow in the aggregation layer uses this information along with the service discovery mechanism described above to check the pre-requisites.

Services on these clusters can continue to be configured with cluster-specific authorization rules that refer to the identities of the users on the individual clusters. The software uses an identity propagation mechanism that propagates the identity of the user from itself to services on each cluster by using a protocol that acquires a user specific token for specific services on a cluster. This protocol mandates a trust relationship to be established between the software and the clusters and also can have authorization capabilities for enhancing security of the identity propagation mechanism.

Services in the aggregation layer include a deployment of the open source software Apache Knox as a micro service that is configured to authenticate users against an identity provider. The configuration includes information about how to reach the identity provider, and other provider specific information. For example, for LDAP, this can be the LDAP URL, admin user and password, search bases in the LDAP tree for looking up users or groups, the names of the object classes for users and groups etc. In this implementation, Apache Knox may be used as the authentication subsystem on the aggregation layer. However, as described earlier, this can be substituted with any other authentication system that provides standardized authentication facilities like OIDC, SAML, and so on. Most of these systems authenticate the user using standard credentials like username and password. They can then be used to encapsulate the user's identity into an opaque string called a token. This string is encoded using a secret signing material that typically uses public key encryption mechanisms like a keypair. The token is signed using one part of the keypair like a private key, and it can be decoded using a public key of the same keypair. When a user authenticates to the identity provider using the authentication service, a token is setup to encapsulate information about the user. This is encrypted with a private key. Any system configured with the public key of this pair can validate the cookie.

In order to provide authenticated access to any HDP cluster service, a centralized authentication service like Apache Knox must be installed on the cluster and configured to provide single sign on facilities to the cluster services. The identity propagation mechanism requires that this service be configured with a specific service, called a topology in Knox terms. This topology can map a Knox authenticated token to a cluster specific token that can be used in REST API calls to sign on to SSO enabled services. This mapped token preserves the identity of the user authenticated in the system, and passes this identity to the cluster services. Thereby, any authorization settings for that user in the cluster services will automatically be applied to API calls made from system services.

The above solution implies that the aggregation layer must make a special call to the authentication service on the cluster to get the mapped SSO token that is specific to a cluster's context, before any calls are made to the cluster services. Further, the authentication service on the cluster must be configured with the public key of the aggregation layer's microservice as described above. In order to further protect this instance, we can setup authorization rules that restrict who can make these calls, like which hosts the request can come from (by IP address), or which users can make these calls.

Figure 7:
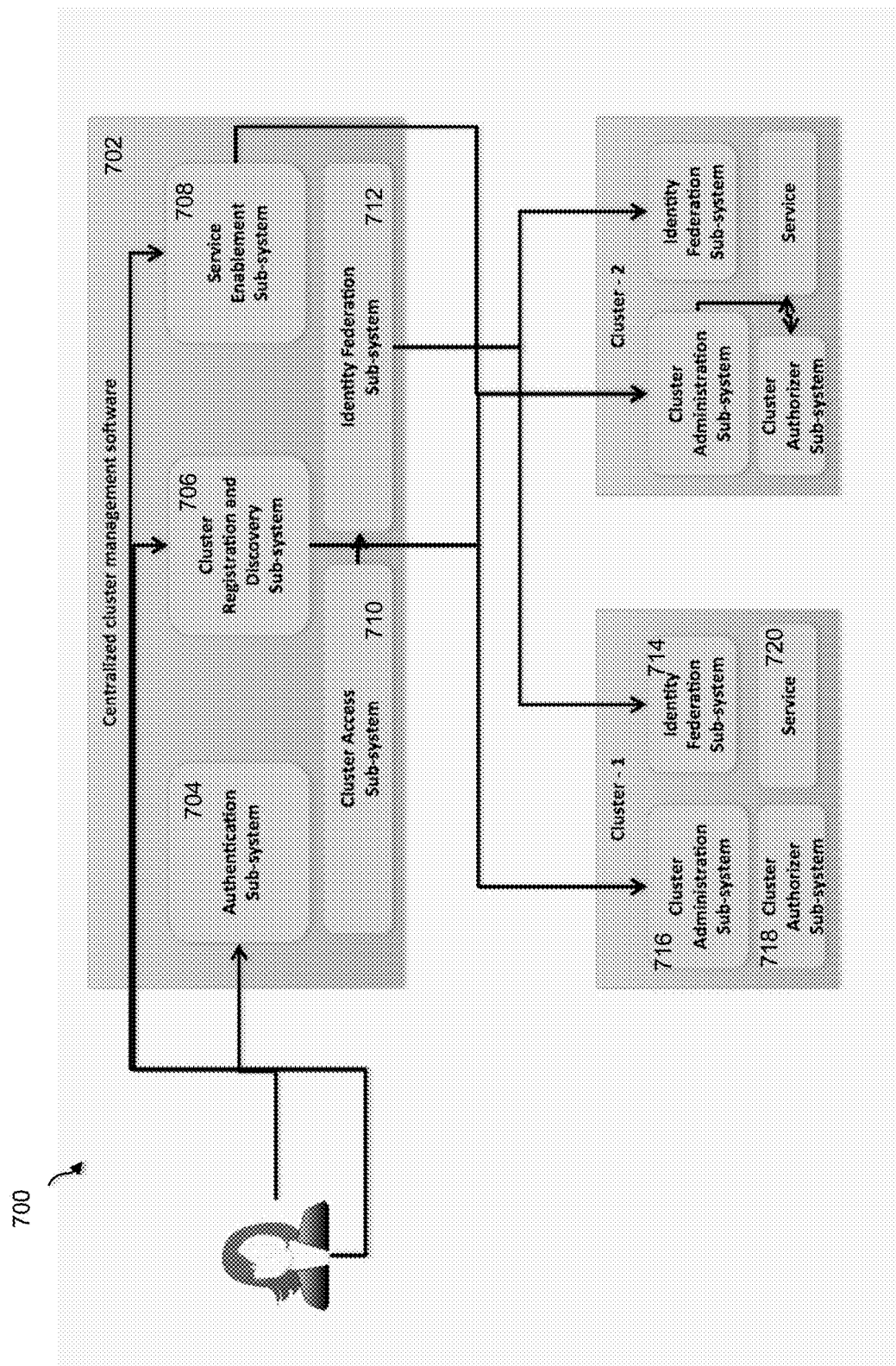
FIG. 7 is a block diagram of aggregation layer for a centralized application management processing component for the extensible application management framework, under some embodiments.

FIG. 7 is a block diagram of an aggregation layer for a centralized application management processing component for the extensible application management framework, under some embodiments. FIG. 7 illustrates a system 700 that provides centralized and secure service deployment and access layer spanning multi-cluster environments, under some embodiments. Such a system provides a single pane of glass for administering multiple clusters, while retaining cluster specific authorization and access controls, and provides an easy to use user experience via intuitive workflows. System 700 includes certain components and sub-systems in a centralized cluster management software component 702 and an identity federation sub-system in this component and in each cluster. The authorization aspects of the aggregation layer for the centralized application manager 500 of FIG. 5 is delegated to the security controls component 308 of FIG. 3.

As shown in FIG. 7, component 702 includes an authentication sub-system 704, which can comprise a Knox instance described above packaged as a micro-service. Alternatively, this could also be implemented as any other authentication service like Apache Keycloak. This system is configured as part of the setup of the centralized cluster management software with details of the identity provider like its LDAP URL, and so on, as described above. The user provides their user credentials to this sub-system. The cluster registration and discovery subsystem 706 is a service that is responsible for taking a cluster's Ambari service URL as input and then uses the Ambari service APIs to discover details about the cluster, such as what services it is running, and on which hosts. The user interacts with this sub-system through a web application over HTTP. For the example of FIG. 7, two clusters denoted Cluster-1 and Cluster-2 are shown as being managed by component 702, though any practical number of clusters may be included.

A service enablement subsystem 708 is configured with the knowledge of services in the aggregation layer, and their metadata including which services on the cluster are required for this service. This subsystem then implements the workflow to determine cluster compatibility for a service, as described above. The user interacts with this subsystem through a web application over HTTP. The cluster access subsystem 710 is a utility service that encapsulates the cluster interactions with the Apache Knox system described above in the identity propagation protocol. A corresponding cluster administrator subsystem 716 in each cluster (e.g., Cluster-1) may be implemented as an Apache Ambari instance that provides installation, configuration management and health checks for services running on the cluster.

An identity federation subsystem 712 works closely with both the authentication subsystem 704 and the cluster access subsystem 710 to propagate the identity of the logged in user to each service on the cluster. A corresponding identity federation subsystem 714 in each cluster provides the capability to accept a token coming from the aggregation layer services, validate it and issue a token that valid to access cluster services A cluster authorizer subsystem 718 is responsible for checking if a user can access a service on the cluster, and a service 720 represents any service on the cluster that we can access through the centralized cluster management software 702.

Figure 8:
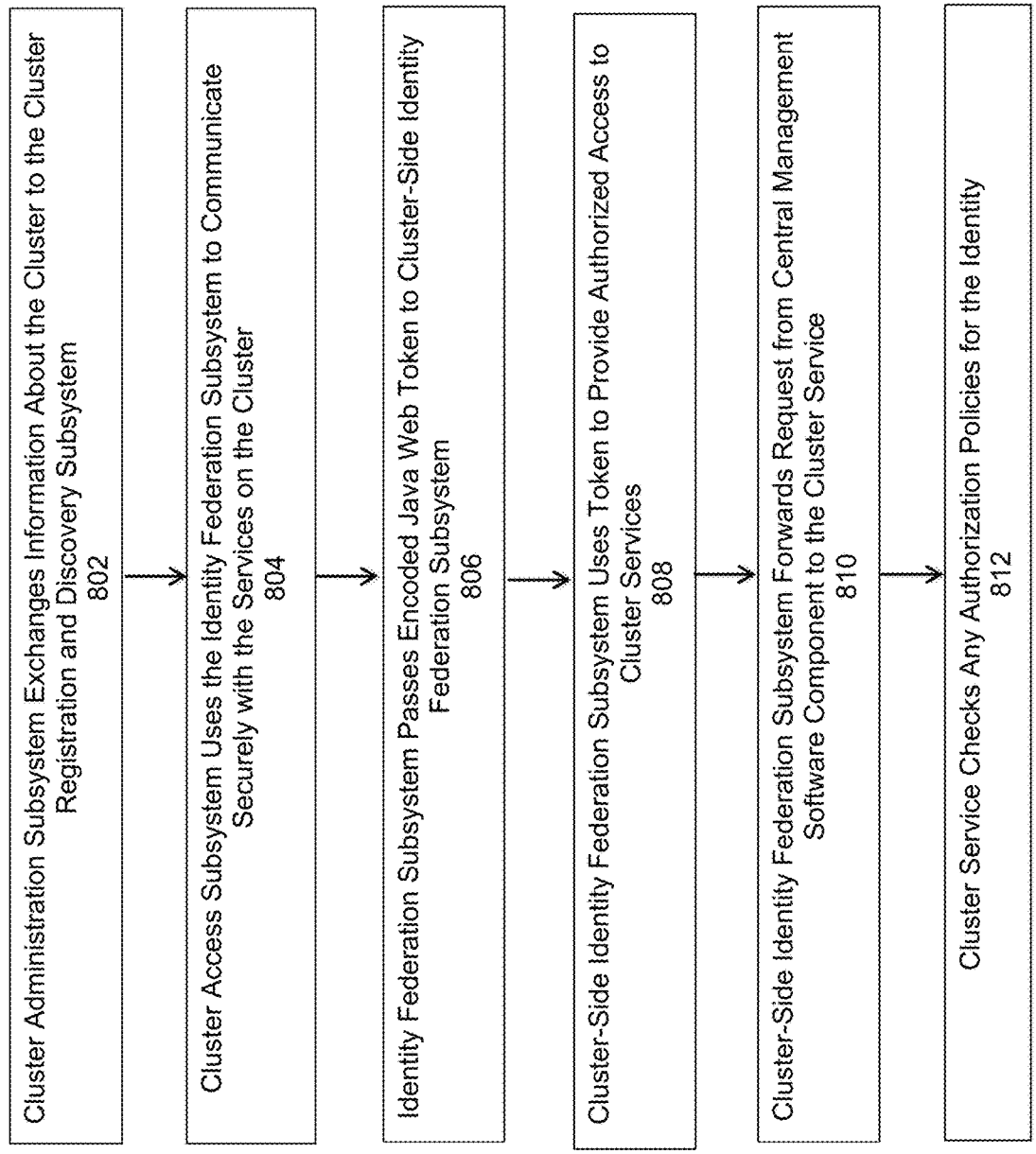
FIG. 8 is a flowchart that illustrates certain interactions between the various subsystems for the aggregation component of the centralized application management system of FIG. 7, under some embodiments.

FIG. 8 is a flowchart that illustrates certain interactions between the various subsystems for the aggregation component of the centralized application management system of FIG. 7, under some embodiments. The process flow of FIG. 8 starts with step 802 wherein the cluster administration subsystem 716 of a cluster exchanges information about the cluster to the cluster registration and discovery subsystem 706 over a RESTful HTTP API. This information includes details about the cluster, including metadata like its names, number of nodes, their health status, the services installed on the cluster, their versions, and their status. The information enables the cluster registration and discovery subsystem to populate its data store with information about the cluster that can in turn to be used to provide an aggregate view of multiple clusters in the centralized cluster management software 702 providing a single point of access to the user.

In an embodiment, the cluster administration subsystem 716 exchanges information about services to the cluster registration and discovery subsystem 706 over a RESTful HTTP API. This information enables the cluster registration and discovery subsystem to determine how compatible a cluster is with respect to enabling certain services on the centralized cluster management software 702. Based on this compatibility, the central management software can enable specific services in the aggregation layer. In step 804, the cluster access sub-system 710 uses the identity federation subsystem 712 in the central management layer to communicate securely to the services on the cluster. The information exchanged includes authentication information of the user encoded as a Java web token.

The identity federation subsystem 712 in the central management layer communicates with its peer on the cluster side to pass on the encoded Java web token to the cluster side, step 806. Using this token, the corresponding subsystem 714 on the cluster side can authenticate and identify the user and services can use that identity to provide authorized access to services in the cluster, step 808. Once the identity is established, the identity federation subsystem in the cluster forwards requests from the central management software layer to the cluster service, step 810. The information passed to the cluster service would be specific to the kind of service being accessed. The established user identity is passed on encoded using a Java web token to the service. In its turn, the service contacts the cluster authorizer subsystem 718 to check any authorization policies for this identity, step 812. These policies grant or revoke rights to access different actions or resources on this service. The service uses the policy information to protect access to these actions or resources.

Services on these clusters can continue to be configured with cluster specific authorization rules that refer to the identities of the users on the individual clusters. The software uses an identity propagation mechanism that propagates the identity of the user from itself to services on each cluster by using a protocol that acquires a user specific token for specific services on a cluster. This protocol mandates a trust relationship to be established between the software and the clusters and also can have authorization capabilities for enhancing security of the identity propagation mechanism. In general, the system provides a single pane of glass for administering multiple clusters, while retaining cluster specific authorization and access controls.

Dataplane Implementation

Figure 9:
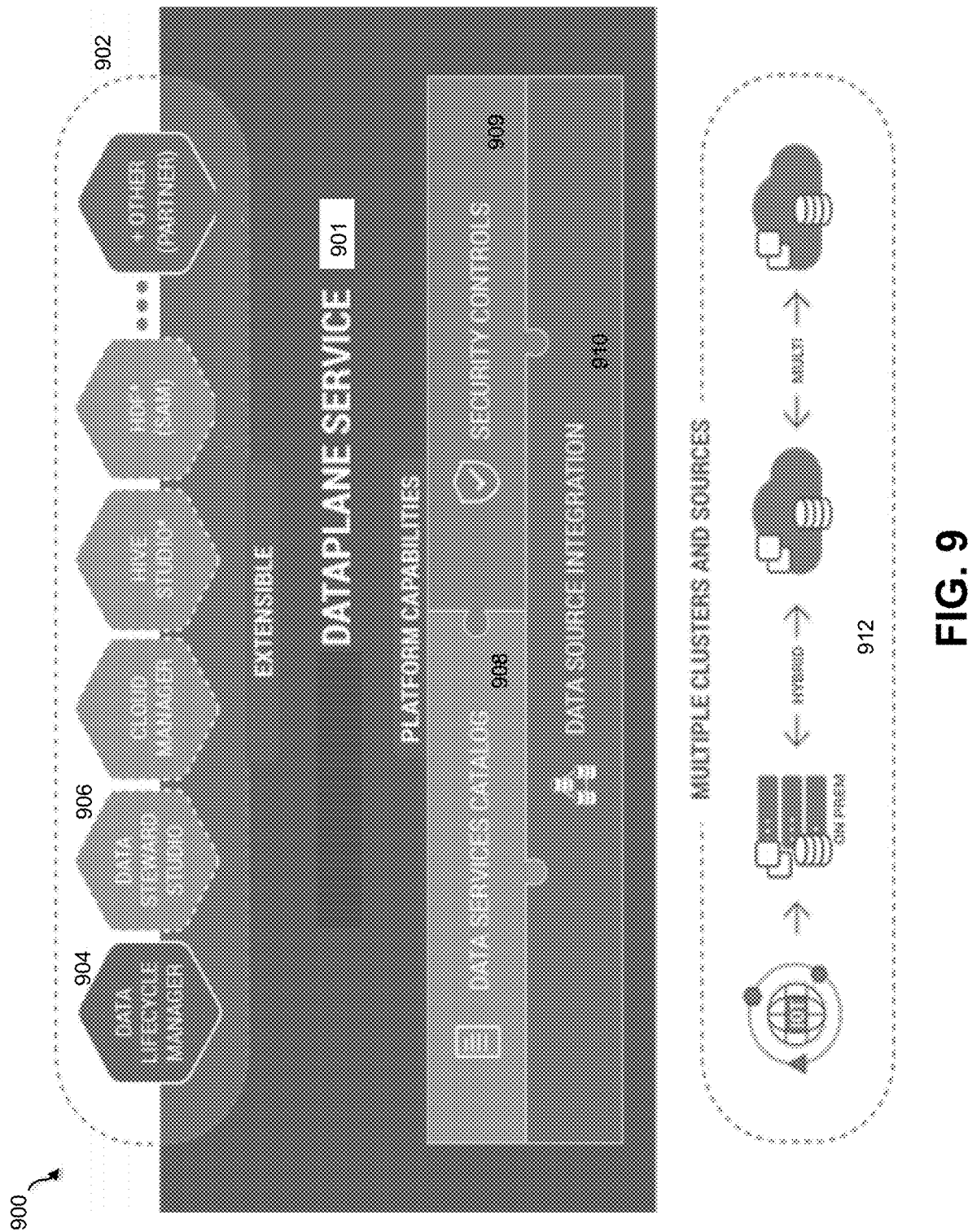
FIG. 9 illustrates a comprehensive data management platform (dataplane) that implements embodiments of an extensible framework for managing multiple Hadoop clusters, under some embodiments.

System 100 may represent a large-scale or enterprise-scale system in which an organization executes various different data-driven technologies. A typical modern data architecture captures and processes huge amounts of data in real-time. Such data may be classified as "big data" and more commonly "data lakes." Embodiments of the data management process help facilitate the capture, storage and processing of large and growing amounts of data generated and ingested in the system. FIG. 9 illustrates a comprehensive data management platform referred to as a "dataplane" system that comprises a portfolio of data applications 902 that enable organizations to discover, manage, govern and optimize their data across hybrid environments. With respect to FIG. 9, aspects of the extensible management system 902 of FIG. 9 are implemented at least in the data access component 301 of FIG. 3. The authorization aspects of the aggregation layer for the security controls 909 of FIG. 9 is delegated to the security controls component 308 of FIG. 3.

In an embodiment, the dataplane system 900 consists of a unified dataplane service 901 and an extensible set of applications 902, including: a data lifecycle manager 904, a data steward studio 906, and other applications including a streams messaging manager, and a data analytics studio. All of these applications operate on top of the service platform 901, which serves as a management layer across an organization's clusters 912, whether they are on-premises or in the cloud. The data lifecycle manager (DLM) 904 is a service that safeguards the organization's data by replicating it in on-premises data center(s) or in the cloud. The data steward studio (DSS) 906 enables the organization to discover, understand and govern its data across on-premises and cloud clusters. A data analytics studio (DAS) may be used to provide diagnostic tools and intelligent recommendations to business analysts and IT teams. A streams messaging manager may also be provided as a management and monitoring tool stream processing tools, such as Apache Kafka and similar products.

System 900 of FIG. 9 represents a new service to manage, govern and secure data and workloads across multiple sources (e.g., databases, enterprise data warehouses (EDWs), clusters, data lakes), types of data (e.g., at-rest or in-motion), and tiers of data (e.g., on-premises, multiple clouds, hybrid). The dataplane service 901 includes certain platform capability components such as a data services catalog 908 that is a catalog of available services and functionality to allow for new services to be created and extend the platform, where the services 902 include the data lifecycle manager and possible extensions from organization partners. Another component is the security controls 909, which is a persona-based controls mechanism that allows users (e.g., Hadoop operators, data stewards, business analysts, data scientists, etc.) to get the right access to the right information. A data source integration component 910 is a layer that allows data processing system (DPS) users to understand the data in external sources.

The data stored and processed by system 900 may comprise any relevant data of concern to companies, organizations, enterprises and so on, and may comprise highly sensitive or confidential information, such as financial information, medical information, personal identification information, trade secrets, confidential business or government information, and so on. Such data may comprise data assets that directly generate revenue or represent valuable or sensitive information. Such data may also be monitored, regulated, stored or otherwise processed by other entities and under certain rules and statutes, such as HIPAA (Health Insurance Portability and Accountability Act), GDPR (General Data Protection Regulation), privacy acts (e.g., California Consumer Privacy Act), and so on.

Figure 10:
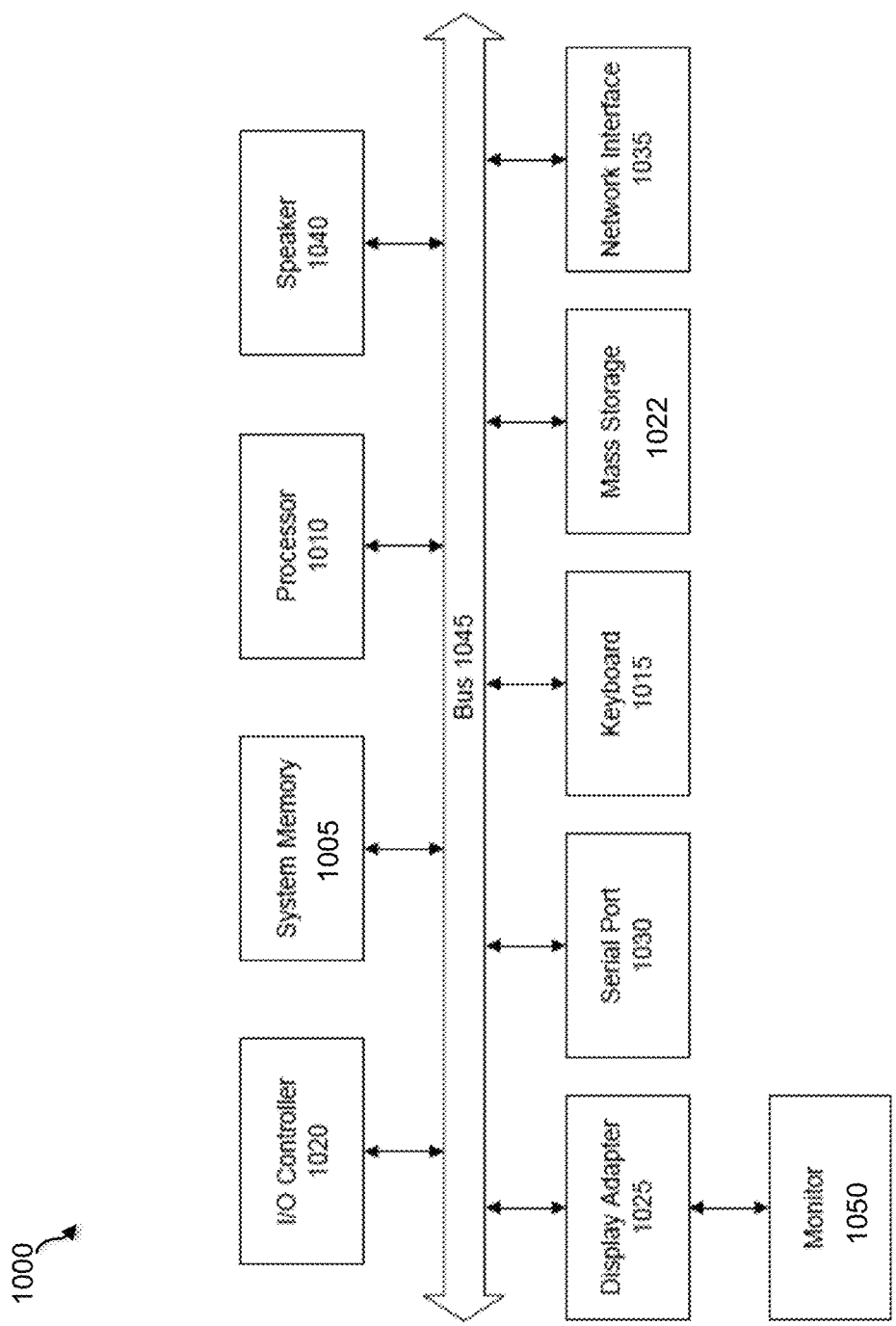
FIG. 10 is a block diagram of a computer system used to execute one or more software components of a Hadoop multi-cluster processing system, under some embodiments.

The network environment of FIG. 1 may comprise any number of individual client-server networks coupled over the Internet or similar large-scale network or portion thereof. Each node in the network(s) comprises a computing device capable of executing software code to perform the processing steps described herein. FIG. 10 is a block diagram of a computer system used to execute one or more software components of an extensible management system for a multi-cluster processing environment, under some embodiments. The computer system 1000 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of securely managing data in a large-scale computer network coupling one or more client computers to a server and having multiple clusters having respective services, comprising:
    deploying, in the server, a centralized application management process comprising an authentication sub-system and a cluster access sub-system;
    deploying, in each cluster of the multiple clusters, a respective identity federation subsystem and a respective cluster administration subsystem;
    exchanging, through the respective cluster administration subsystem, information about each cluster to a cluster registration and discovery subsystem of the server;
    using the respective identity federation subsystem in a cluster to communicate securely with services on the cluster and propagate an identity of a logged-in user to each service in the cluster;
    passing, from the authentication subsystem, an encoded token for the logged-in user to the identity federation subsystem in the cluster;
    using the token to provide authorized access to each service on the cluster;
    discovering other services in the clusters by each respective cluster administration subsystem; and
    setting up a Single Sign On (SSO) configuration for the service and the other services in the clusters to enable single sign on for the user on all clusters in the network.

2. The method of claim 1 wherein the network comprises a plurality of multi-node clusters implementing a distributed file system organizing data stored in cloud-based storage, network storage, and local device storage.

3. The method of claim 2 wherein the distributed file system comprises a Hadoop Distributed File System (HDFS) operating in a Hadoop infrastructure running on the network.

4. The method of claim 3 wherein the services on the cluster comprise at least one of: security, metadata management, data processing, and cluster management, and are invoked through representational state transfer (REST) application programming interfaces (APIs).

5. The method of claim 1 wherein the network comprises a big data environment, and wherein the server is deployed as part of a data plane system, and the multiple clusters comprise multiple different data sources, data types and data tiers.

6. The method of claim 1 wherein the identity of the user is maintained in an identity federation subsystem that propagates the identity of each valid logged-in user to each service in a cluster.

7. The method of claim 1 further comprising checking, in the cluster, for any authorization policies for the identity, wherein the authorization policies grant or revoke rights to access different actions or resources on the service, and wherein the service uses the policy information to protect access to actions of the user or resources of the cluster.

8. The method of claim 7 further comprising checking, through a cluster authorizer subsystem, whether a user is the valid logged-in user for access to the each service through an authentication service.

9. The method of claim 8 wherein the authentication service provides user authentication through an identity provider including one of: a lightweight directory access protocol (LDAP) source, an OpenID Connect (OIDC) program, or a Security Assertion Markup Language (SAML) program.

10. A system for securely managing data in a large-scale computer network coupling one or more client computer to a server and having multiple clusters, comprising:
    a centralized application management process deployed in the server and comprising an authentication sub-system and a cluster access sub-system;
    a respective identity federation subsystem and a respective cluster administration subsystem deployed in each cluster of the multiple clusters;
    the cluster administration subsystem exchanging information about each cluster to a cluster registration and discovery subsystem of the server;
    an identity federation subsystem in a cluster communicating securely with services on the cluster and propagate an identity of a logged-in user to each service in the cluster;
    an interface passing, from the authentication subsystem, an encoded token for the logged-in user to the identity federation subsystem in the cluster;
    a management component using the token to provide authorized access to each service on the cluster; and
    a discovery component discovering other services in the clusters by each respective cluster administration sub-system, and setting up a Single Sign On (SSO) configuration for the service and the other services in the clusters to enable single sign on for the user on all clusters in the network.

11. The system of claim 10 wherein the network comprises a plurality of multi-node clusters implementing a distributed file system organizing data stored in cloud-based storage, network storage, and local device storage.

12. The system of claim 11 wherein the distributed file system comprises a Hadoop Distributed File System (HDFS) operating in a Hadoop infrastructure running on the network.

13. The system of claim 12 wherein the services on the cluster comprise at least one of: security, metadata management, data processing, and cluster management, and are invoked through representational state transfer (REST) application programming interfaces (APIs).

14. The system of claim 10 wherein the network comprises a big data environment, and wherein the server is deployed as part of a data plane system, and the multiple clusters comprise multiple different data sources, data types and data tiers.

15. The system of claim 10 wherein the identity of the user is maintained in an identity federation subsystem that propagates the identity of each valid logged-in user to each service in a cluster.

16. The system of claim 10 further comprising a policy component checking for any authorization policies for the identity, wherein the authorization policies grant or revoke rights to access different actions or resources on the service, and wherein the service uses the policy information to protect access to actions of the user or resources of the cluster.

17. The system of claim 16 further comprising a cluster authorizer subsystem checking whether a user is the valid logged-in user for access to the each service through an authentication service, and wherein the authentication service provides user authentication through an identity provider including one of: a lightweight directory access protocol (LDAP) source, an OpenID Connect (OIDC) program, or a Security Assertion Markup Language (SAML) program.

18. A computer program product containing software code, which when executed by a hardware processor, cause a computer to perform a method for securely managing data in a large-scale computer network coupling one or more client computer to a server and having multiple clusters having respective services, and comprising:

deploying, in the server, a centralized application management process executed by the hardware processor and comprising an authentication sub-system and a cluster access sub-system;

deploying, in each cluster of the multiple clusters, a respective identity federation subsystem and a respective cluster administration subsystem;

exchanging through the respective cluster administration subsystem, information about each cluster to a cluster registration and discovery subsystem of the server;

using the respective identity federation subsystem in a cluster to communicate securely with services on the cluster and propagate an identity of a logged-in user to each service in the cluster;

passing, from the authentication subsystem, an encoded token for the logged-in user to the identity federation subsystem in the cluster; and using the token to provide authorized access to each service on the cluster;

discovering other services in the clusters by each respective cluster administration subsystem; and setting up a Single Sign On (SSO) configuration for the service and the other services in the clusters to enable single sign on for the user on all clusters in the network.

* * * * *